United States Patent
Hughes et al.

(10) Patent No.: US 6,658,537 B2
(45) Date of Patent: Dec. 2, 2003

(54) DMA DRIVEN PROCESSOR CACHE

(75) Inventors: John H. Hughes, San Jose, CA (US); Chris M. Thomson, Pleasanton, CA (US)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/075,307

(22) Filed: May 8, 1998

(65) Prior Publication Data

US 2001/0011330 A1 Aug. 2, 2001

Related U.S. Application Data

(60) Provisional application No. 60/049,079, filed on Jun. 9, 1997.

(51) Int. Cl.[7] .......................... G06F 12/00; G06F 13/28
(52) U.S. Cl. .......................... 711/141; 711/143; 710/22
(58) Field of Search .............................. 711/141, 142, 711/143, 135, 146, 144, 145; 710/22

(56) References Cited

U.S. PATENT DOCUMENTS

| | | | | |
|---|---|---|---|---|
| 4,933,835 A | * | 6/1990 | Sachs et al. ................ 364/200 |
| 5,119,485 A | * | 6/1992 | Ledbetter, Jr. et al. ...... 395/425 |
| 5,347,634 A | * | 9/1994 | Herrell et al. ............... 395/250 |
| 5,524,208 A | * | 6/1996 | Finch et al. ........... 395/183.01 |
| 5,572,701 A | * | 11/1996 | Ishida et al. ................ 395/473 |
| 5,613,153 A | * | 3/1997 | Arimilli et al. ............. 395/821 |
| 5,652,915 A | * | 7/1997 | Jeter ............................ 395/872 |
| 5,659,710 A | * | 8/1997 | Sherman ...................... 711/146 |
| 5,668,956 A | * | 9/1997 | Okazawa et al. ........... 395/306 |
| 5,796,979 A | * | 8/1998 | Arimilli et al. ............. 395/469 |
| 5,813,036 A | * | 9/1998 | Ghosh et al. ............... 711/146 |
| 5,859,990 A | * | 1/1999 | Yarch .......................... 395/311 |
| 5,860,111 A | * | 1/1999 | Martinez, Jr. et al. ...... 711/143 |
| 5,875,352 A | * | 2/1999 | Gentry et al. ............... 395/843 |
| 5,893,141 A | * | 4/1999 | Kulkarni ..................... 711/118 |
| 5,893,153 A | * | 4/1999 | Tzeng et al. ................ 711/141 |
| 5,900,017 A | * | 5/1999 | Genduso ..................... 711/146 |
| 5,941,968 A | * | 8/1999 | Mergard et al. ............ 710/128 |
| 5,950,227 A | * | 9/1999 | Kulkarni ..................... 711/143 |
| 5,953,538 A | * | 9/1999 | Duncan ....................... 395/842 |
| 6,018,763 A | * | 1/2000 | Hughes et al. .............. 709/213 |

* cited by examiner

*Primary Examiner*—Kimberly McLean-Mayo
(74) *Attorney, Agent, or Firm*—McDonnell Boehnen Hulbert & Berghoff

(57) ABSTRACT

The present invention provides a mechanism whereby caching operations, such as prefetch and copyback operations, can be initiated by an external direct memory access (DMA) controller. This allows the DMA controller to govern the inclusion as well as exclusion of data from a processor cache in such as way as to avoid unnecessary cache faults, and to thereby improve system performance. Thus, the present invention effectively provides a synchronization mechanism between an external DMA controller and a processor cache.

10 Claims, 2 Drawing Sheets

Cache State Transitions

Read Demand

Write Demand

Read Clearance

Write Clearance

DMA DRIVEN PROCESSOR CACHE

RELATED APPLICATIONS

This application claims priority under 35 U.S.C. §119(e) to Provisional patent application Ser. No. 60/049,079, filed Jun. 9, 1997, by inventors John H. Hughes and Chris M. Thomson, which application is incorporated herein by reference in its entirety.

BACKGROUND

1. Field of the Invention

The present invention relates to computer systems that store instructions and data within a cache memory, and more particularly to a method for initiating cache prefetch and copyback operations through instructions issued by an external controller, such as a DMA controller.

2. Related Art

The performance of advanced microprocessors depends on high hit rates in their internal instruction and data caches. Network routing applications, for routing packets through a data network, have ideal characteristics for high instruction cache hit rate, but the flow-through nature of packet data makes the data cache hit rate low, because the data is often removed from the data cache when it is modified by the external interfaces and must be reloaded before a processor can access it.

Microprocessors, such as the PowerPC 604e manufactured by the Motorola Corporation, include a 64 bit bus to interface with external memory and the I/O subsystem. This bus is optimized for moving data to and from the internal L1 caches and for maintaining cache coherency amongst multiple processors. The 60x bus includes a control path to specify the bus operations between processors, including data transfer, cache coherency, and synchronization operations.

The 604e processor can be clocked internally at four or more times the rate of its external interface. This results in a multiple cycle delay when the processor needs to access data from external memory. This delay is on top of the normal latency for memory accesses.

Compilers can sometimes remove part of this delay for static memory references by moving a cache "load" instruction within a piece of executable code, so that there is more time between the load operation and the usage of the data retrieved by the load operation. However, for dynamic memory references, in which the location of a desired data item may not be known beforehand, this is more difficult, if not impossible.

A special case that occurs frequently is a dynamically referenced structure within a loop where the (N+1)th memory address is known during the Nth loop iteration. The 604e processor includes cache prefetch instructions that can be used to bring the (N+1)th data into the cache while the Nth iteration is executing.

When there is an interaction between the processor, the memory and an external DMA controller, the problem becomes yet more difficult. If the processor prefetch, either by compiler scheduling or explicit instruction, is moved too far from the usage of the prefetched data, the possibility exists that the DMA controller will modify the data in memory, thus, negating the advantage of the prefetch.

What is needed is a mechanism that initiates prefetching of data, such as flow-through I/O data, into a processor cache.

SUMMARY

The present invention provides a mechanism whereby caching operations, such as prefetch and copyback operations, can be initiated by an external direct memory access (DMA) controller. This allows the DMA controller to govern the inclusion as well as exclusion of data from a processor cache in such as way as to avoid unnecessary cache faults, and to thereby improve system performance. Thus, the present invention effectively provides a synchronization mechanism between an external DMA controller and the processor cache.

The present invention can be characterized as a computing system, comprising: a processor including a cache; a memory coupled with the processor; a direct memory access device coupled with the processor and the memory; wherein the processor includes a mechanism that, in response to a command form the direct memory access device, potentially modifies an entry in the cache.

The present invention may also be characterized as method for updating a cache, the method operating in a system including, a processor including the cache, a memory coupled with the processor, and a direct memory access device coupled with the processor and the memory, the method comprising the steps of: receiving at the processor a command from the direct memory access device; and in response to the command, potentially updating an entry in the cache.

According to one aspect of the present invention, the above-mentioned method includes the step of modifying an entry within the memory.

DESCRIPTION

The following description is presented to enable any person skilled in the art to make and use the invention, and is provided in the context of a particular application and its requirements. Various modifications to the disclosed embodiments will be readily apparent to those skilled in the art and the general principles defined herein may be applied to other embodiments and applications without departing from the spirit and the scope of the present invention. Thus, the present invention is not intended to be limited to the embodiments shown, but is to be accorded the widest scope consistent with the principles and features disclosed herein.

Figure 1:
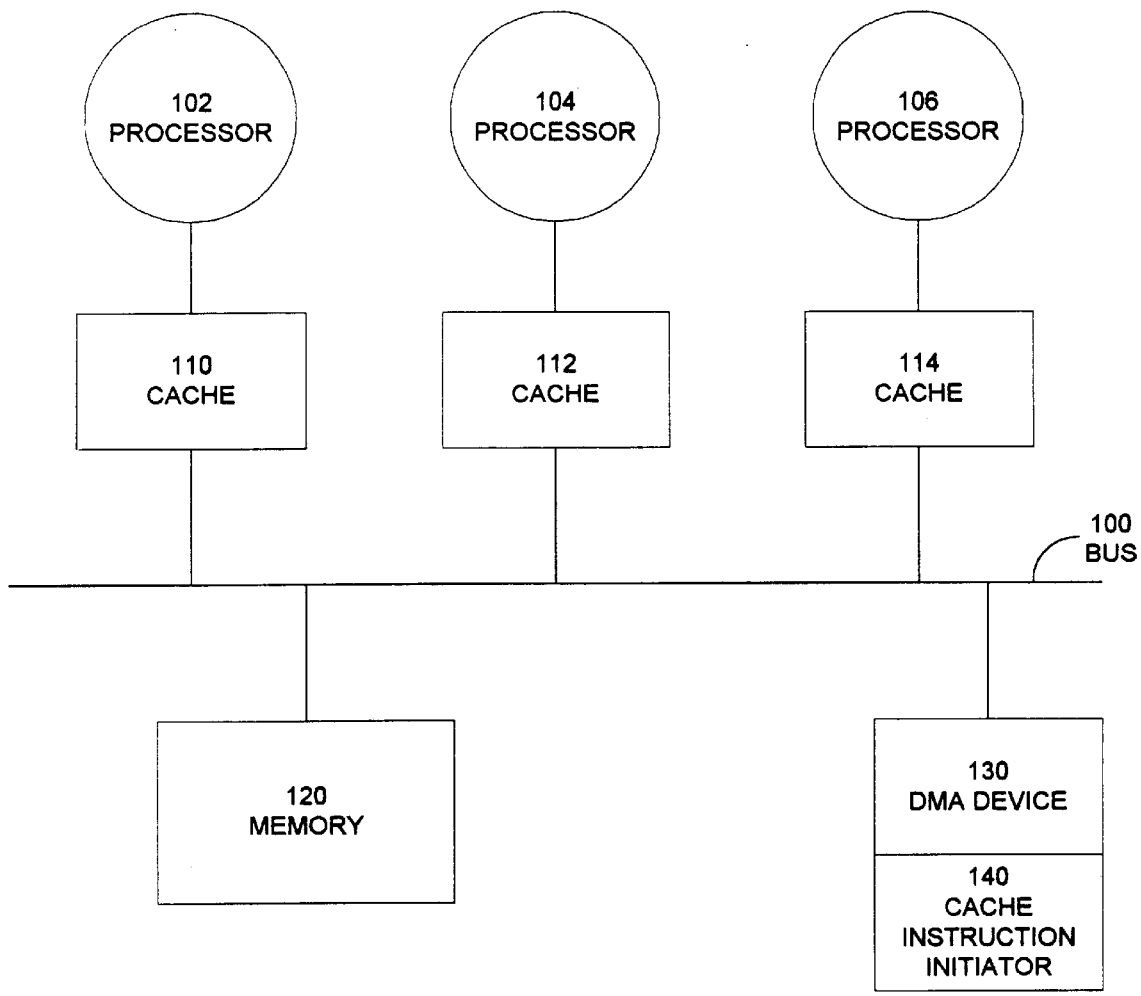
FIG. 1 is a block diagram of some of the major functional components of a computing system including DMA device 130 with cache instruction initiator 140 in accordance with an aspect of the present invention.

FIG. 1 is a block diagram of some of the major functional components of a computing system, including DMA device 130 with cache instruction initiator 140 in accordance with an aspect of the present invention. FIG. 1 includes: processors 102, 104 and 106; caches 110, 112 and 114; bus 100; memory 120 and DMA device 130. Processors 102, 104 and 106 may be any type of processor system, including processors comprised of multiple chips as well as single-chip microprocessor systems. Caches 110, 112 and 114 are coupled to processors 102, 104 and 106, respectively. Caches 110, 112 and 114 contain instruction and/or data used by processors 102, 104 and 106, respectively. Caches 110, 112, and 114 are coupled to bus 100, which is also coupled to memory 120. Memory 120 is any type of memory for storing instructions and data used by processors 102, 104 and 106. In one embodiment, memory 120 includes semiconductor memory. In another embodiment, memory 120 includes a magnetic storage device such as a disk drive. Bus 100 is also coupled to DMA device 130, which is any type of I/O device, such as a disk drive controller or a network interface controller, that can directly transfer data to and/or from memory 120. DMA device 130 includes cache instruction initiator 140, which is a mechanism within DMA device 130 that initiates certain instructions, such as prefetch and copyback instructions for caches 110, 112 and 114.

The embodiment of the computing system in FIG. 1 includes a plurality of processors and a plurality of caches. These processors and caches comprise a multiprocessor system in which the caches are kept coherent with one another through a cache coherence mechanism. This cache coherence mechanism may include additional cache coherence control lines within bus 100.

Another embodiment of the present invention operates in a computing system including only a single processor coupled through at least one cache to bus 100. In this embodiment, no cache coherence maintenance is required.

Figure 2:
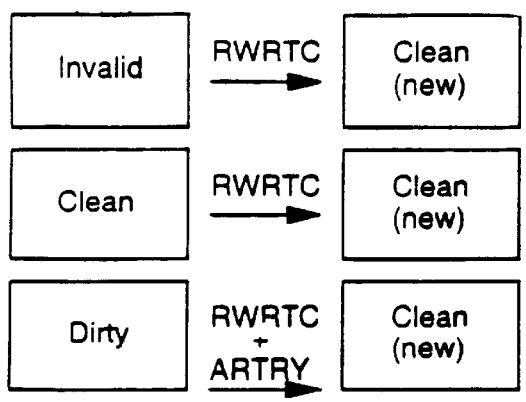
FIG. 2 is a diagram illustrating the functions of cache operations initiated by a DMA device, such as DMA device 130 in FIG. 1, in accordance with an aspect of the present invention.
Figure 2:
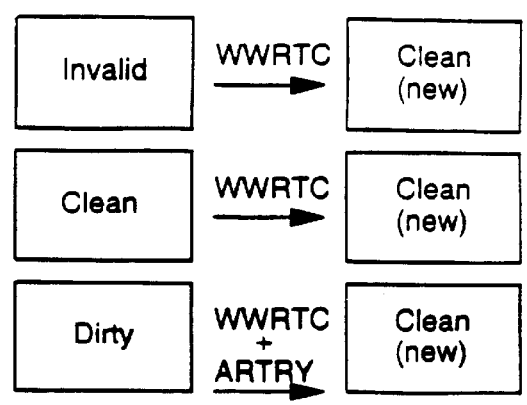
Figure 2:
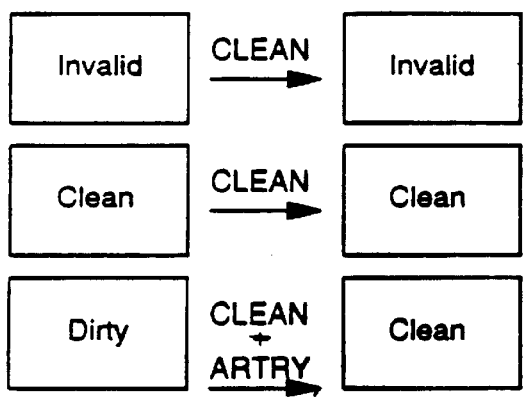
Figure 2:
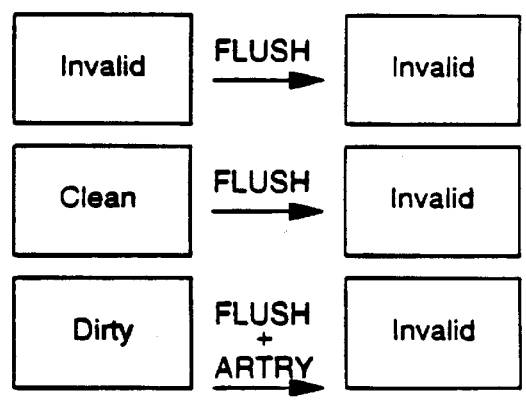

FIG. 2 is a diagram illustrating the functions of cache operations initiated by a DMA device, such as DMA device 130 in FIG. 1, in accordance with an embodiment of the present invention. In this embodiment, the four operations initiated by the DMA controller are: (1) write demand, (2) read demand, (3) write clearance, and (4) read clearance. Schematically, the four operations have twelve interactions with the processor cache as are illustrated in FIG. 2. The three starting cache states are: (1) invalid, which means data is absent from cache; (2) clean, which means data is unmodified in cache; and (3) dirty, which means data has been modified in cache, but the modifications have not been flushed back to memory 120. The three ending cache states are: (1) invalid; (2) clean, which means existing data is unmodified in cache; and (3) clean(new), which means new data is unmodified in cache.

FIG. 2 illustrates the bus commands that cause the cache state transitions. The abbreviation WWRTC is short for "write with request to cache." The abbreviation RWRTC is short for "read with request to cache." Four of the operations have an additional "+ARTRY" This indicates that the processor will respond to the initial bus command with an address retry. This response causes the DMA controller to repeat the bus command after allowing the processor to copy the modified data back to memory 120.

The write demand operation is used to place data directly into the processor cache as it is written to memory by DMA controller 130. In one embodiment, the data is written into caches 110, 120 and 130 at the same time is it being written into memory 120. Caches 110, 112 and 114 simply pull the data off of bus 100 as it passes from DMA device 130 to memory 120. Once the data is written in to caches 110, 112 and 114, it is marked "clean" and can be shared between multiple processors. If there exists a dirty entry in one of the caches, the DMA device must wait for the dirty entry to be copied back to memory 120 before proceeding with the WWRTC operation.

The read demand operation is the complement of the write demand operation and can be thought of as an externally triggered cache prefetch instruction. The read demand operation operates in the same way as the write demand operation, except that data is read from memory 120 by DMA device 130, instead of being written to memory 120 by DMA device 130.

The write clearance operation is used to force the cache to move specific modified data back to memory 120 so that DMA controller 130 can complete a subsequent write to memory without incurring processor copyback latency. If the entry exists in a cache and it is dirty, it is first flushed back to cache. Then the entry is removed from cache by marking the cache entry as invalid.

The read clearance operation is the complement of the write clearance operation, and is used prior to a DMA read to insure that memory is consistent with all the processor caches, allowing immediate memory read access. If the entry exists in cache it is flushed back and the entry is marked clean. Otherwise, the entry is not modified.

One embodiment of the present invention includes one or multiple processor identifiers with the above-described commands issued by DMA device 130. Only the caches corresponding to the processor identifiers respond to the command.

In one embodiment, a processor configures or commands DMA controller 130 to perform the above-mentioned commands. In another embodiment, DMA controller 130 itself initiates the commands. In yet another embodiment, DMA controller 130 queues the commands into a descriptor list, which DMA controller 130 sequentially executes.

In the particular case of network data processing, DMA controller 130 uses a mix of these commands. The routing information that is required by the processor is contained in a known portion of the packet header. DMA controller 130 uses the WWRTC command to move that data to memory so that the processor cache would have it ready for processing. The remaining data in the packet could be moved to memory using an ordinary write command if it did not need processing. DMA controller 130 can precede the whole sequence of writes to memory with a series of Read clearance or Write clearance operations to eliminate the "+ARTRY" operations. This could be done when the DMA descriptors are programmed.

A more advanced application of this technique is the general 'push' function. An example is status transfer between the external hardware and the processor. There are two methods for synchronizing the external data flow and the processor internal software: interrupts and polling. Polling continuously reads the state of an external register testing for a change of value. Interrupts cause an asynchronous change in program flow as a result of the assertion of an external signal. Polling is lighter weight (has less impact on the software), but causes more bus activity. If the status register is cached, the processor will 'spin' reading the value in the cache and generating no external bus cycles. When the status value changes the external hardware generates WWRTC data transfer cycle which causes the cache to be updated and causes the software to 'see' the new value. In this case the memory transfer is fictitious since the value is only stored in a hardware register that has already been updated.

The foregoing description of embodiments of the invention have been presented for purposes of illustration and description only. They are not intended to be exhaustive or to limit the invention to the forms disclosed. Obviously, many modifications and variations will be apparent to practitioners skilled in the art.

What is claimed is:

1. A processing system, comprising:

a plurality of processors, each of the processors having a cache, each of the caches coupled to a bus;

at least one memory coupled to the bus; and a direct memory access device connected to the bus;

wherein the direct memory access device initiates at least one caching operation by at least one of the plurality of processors, wherein a manipulation is performed on data in at least one of the caches, wherein at least one state of at least one cache is updated in response to the manipulation, wherein that at least one caching operation includes write clearance operations, wherein the write clearance operations cause the at least one cache to move specific modified data back to the at least one memory so that the direct memory access device can complete subsequent writes to memory without incurring processor copyback latency.

2. A processing system, comprising:

a plurality of processors, each of the processors having a cache, each of the caches coupled to a bus;

at least one memory coupled to the bus; and a direct memory access device connected to the bus;

wherein the direct memory access (DMA) device initiates at least one prefetch caching operation by the at least one of the plurality of processors, wherein the at least one prefetch caching operation comprises memory read demand operations and read clearance operations to transfer data from cache to memory prior to a DMA read, wherein a manipulation is performed on data in at least one of the caches at the same time as the manipulation is performed on corresponding data in the at least one memory, wherein at least one cache is updated upon a DMA transfer with memory.

3. A method for cache updating, comprising:

transferring at least one command from a direct memory access device to at least one of a plurality of processors over a bus;

initiating at least one caching operation by the at least one of the plurality of processors in response to the at least one command;

performing a manipulation to data in a cache, and updating at least one state of the cache in response to the manipulation, wherein the at least one caching operation includes write clearance operations, wherein the write clearance operations cause the cache to move specific modified data back to the memory so that the direct memory access device can complete subsequent writes to memory without incurring processor copyback latency.

4. A method for cache updating, comprising:

transferring at least one command from a direct memory access device to am least one of a plurality of processors over a bus;

initiating ax least one prefetch caching operation by the am least one of the plurality of processors in response to the at least one command, wherein the at least one prefetch caching operation includes memory read demand operations and read clearance operations to transfer data from cache to memory prior to a DMA read;

performing a modification to data in a cache; and updating at least one state of the cache in response to a DMA transfer with memory, wherein the at least one caching operation includes write clearance operations, and wherein the write clearance operations cause the cache to move specific modified data basic to the memory so that the direct memory access device Can complete subsequent writes to memory without incurring processor copyback latency.

5. In a network data processing system, a processing system comprising:

a plurality of processors, each of the processors having a cache, each of the caches coupled to a bus;

at least one memory coupled to the bus; and a direct memory access (DMA) device for network data processing of packet data, wherein the DMA device is coupled to the bus, wherein the DMA device initiates at least one caching operation by the at least one of the plurality of processors, wherein a manipulation is performed on network data in at least one of the caches, wherein at least one state of at least one cache is updated in response to the manipulation, wherein the at least one caching operation includes write clearance operations, wherein the write clearance operations cause at least one cache to move routing information extracted from the packet data back to the at least one memory so that the DMA device can complete subsequent writes to memory without incurring processor copyback latency, and wherein the routing information is kept coherent amongst the at least one memory and at least one cache.

6. The processing system of claim 5, wherein the at least one caching operation further comprises at least one operation selected from the group consisting of write-demand operations, wherein the write-demand operations place the routing information directly into the at least one cache at the same time the packet data is written to the at least one memory;

read-clearance operations, wherein the read-clearance operations transfer the routing data from cache to memory before a DMA read; and read-demand operation, wherein the read-demand operation place the routing information directly into the at least one cache at the same time previously stored packet data is read from memory by the DMA device.

7. The processing system of claim 5, wherein when a DMA transfer of the remaining portion of the packet data occurs between the DMA device and the at least one memory, no caching operation is performed.

8. In a network data processing system, a processing system comprising:

at least one processor, the at least one processor having a cache, the cache coupled to a bus;

at least one memory coupled to the bus; and an external register associated with external hardware, wherein the external register contains a status value of the external hardware;

a direct memory access (DMA) device coupled to the bus and external hardware, wherein the DMA device is operable to transfer the status value between the at least one processor and the external hardware when the status value is updated in the external register, wherein when the status values is updated, the DMA device initiates at least one caching operation between the DMA device and the at least one memory, and wherein the at least one caching operation includes write clearance operations, wherein the write clearance operations cause the at least one cache to move the updated status value back to the at least one memory so that the DMA device can complete subsequent writes to memory without incurring processor copyback latency.

9. The processing system of claim 8 wherein the updated status value is kept coherent amongst the external register, the at least one memory and the caches.

10. The processing system of claim 8, wherein the at least one caching operation comprises at least one operation selected from the group consisting of:

write-demand operations, wherein the write-demand operations place the updated status value directly into tile at least one cache at the same time as the updated status value is written to the at least one memory;

read-clearance operations, wherein the read-clearance operations transfer the updated status value from cache to memory before a DMA read operation; and read-demand operation, wherein the read-demand operation place the updated status value directly into the at least one cache at the same time previously stored packet data is read from memory by the DMA device.

* * * * *